(12) United States Patent
Tan

(10) Patent No.: US 10,343,555 B2
(45) Date of Patent: Jul. 9, 2019

(54) AUTONOMOUS VEHICLE SEAT POSITIONING SYSTEM

(71) Applicant: Nissan North America, Inc., Franklin, TN (US)

(72) Inventor: Adrian Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 174 days.

(21) Appl. No.: 15/443,824

(22) Filed: Feb. 27, 2017

(65) Prior Publication Data

US 2018/0244175 A1 Aug. 30, 2018

(51) Int. Cl.

| | |
|---|---|
| *B60N 2/02* | (2006.01) |
| *B60N 2/06* | (2006.01) |
| *B60N 2/22* | (2006.01) |
| *B60K 35/00* | (2006.01) |
| *B62D 1/183* | (2006.01) |

(52) U.S. Cl.
CPC ............ *B60N 2/0248* (2013.01); *B60K 35/00* (2013.01); *B60N 2/0232* (2013.01); *B60N 2/06* (2013.01); *B60N 2/22* (2013.01); *B62D 1/183* (2013.01); *B60K 2350/106* (2013.01); *B60K 2350/901* (2013.01); *B60K 2350/922* (2013.01); *G05D 2201/0213* (2013.01)

(58) Field of Classification Search
CPC ...... B60N 2/0248; B60N 2/0232; B60N 2/06; B60N 2/22; B60K 35/00; B60K 2350/1008; B60K 2350/106; B60K 2350/922; B60K 2350/901; B62D 1/183; G05D 1/0088; G05D 2201/0213

See application file for complete search history.

(56) References Cited

U.S. PATENT DOCUMENTS

| | | | |
|---|---|---|---|
| 6,240,352 B1 | 5/2001 | McCurdy | |
| 6,733,133 B2 | 5/2004 | Egle et al. | |
| 7,036,936 B2 * | 5/2006 | Hattori | ................ B60R 11/0235 353/13 |

(Continued)

FOREIGN PATENT DOCUMENTS

| | | |
|---|---|---|
| DE | 4226747 C1 | 12/1993 |
| EP | 2840000 A2 | 2/2015 |

(Continued)

*Primary Examiner* — Sze-Hon Kong

(74) *Attorney, Agent, or Firm* — Global IP Counselors, LLP

(57) ABSTRACT

An autonomous vehicle seat positioning system has a controller connected to a display, a control panel and a positioning mechanism of a vehicle seat assembly. The controller operates in a position saving mode and a position selecting mode. In the position saving mode, positioning inputs made by the first occupant are saved in memory as a first upright setting corresponding to the first occupant manually driving the vehicle. Positioning inputs made by the first occupant of the vehicle seat assembly are also saved in memory as a first relaxation setting corresponding to the first occupant viewing the display with the vehicle operating in a self-driving mode. In the position selecting mode, the controller operates the positioning mechanism to move the vehicle seat assembly to positions corresponding the first upright setting or the first relaxation setting.

16 Claims, 10 Drawing Sheets

(56) References Cited

U.S. PATENT DOCUMENTS

| | | | |
|---|---|---|---|
| 7,413,233 B1 * | 8/2008 | Jung | B60R 11/0235 296/97.7 |
| 8,231,165 B2 | 7/2012 | Demma | |
| 8,757,807 B1 * | 6/2014 | Disley | G03B 29/00 353/13 |
| 9,184,778 B2 | 11/2015 | Tan | |
| 9,227,531 B2 | 1/2016 | Cuddihy et al. | |
| 9,244,462 B2 | 1/2016 | Pedersen | |
| 9,248,819 B1 | 2/2016 | Tan | |
| 9,404,761 B2 | 8/2016 | Meuleau | |
| 9,507,345 B2 | 11/2016 | Takamatsu | |
| 9,630,569 B2 * | 4/2017 | Richard | B60R 11/04 |
| 2005/0261815 A1 * | 11/2005 | Cowelchuk | B60Q 5/00 701/36 |
| 2008/0272623 A1 | 11/2008 | Kadzban et al. | |
| 2009/0058845 A1 * | 3/2009 | Fukuda | B60K 35/00 345/214 |
| 2010/0117810 A1 * | 5/2010 | Hagiwara | G06F 3/0483 340/425.5 |
| 2011/0115990 A1 * | 5/2011 | Bhaktiar | B60R 11/0235 348/794 |
| 2011/0128453 A1 * | 6/2011 | Cho | G03B 21/28 348/744 |
| 2012/0173069 A1 | 7/2012 | Tsimhoni et al. | |
| 2013/0218420 A1 * | 8/2013 | Jendritza | B60N 2/002 701/49 |
| 2015/0094897 A1 | 4/2015 | Cuddihy et al. | |
| 2015/0138044 A1 * | 5/2015 | Rawlinson | G06F 3/1454 345/2.2 |
| 2016/0082976 A1 | 3/2016 | Sugioka | |
| 2016/0121805 A1 * | 5/2016 | Forsgren | B60R 11/0235 348/837 |
| 2016/0282940 A1 * | 9/2016 | Hong | G06F 3/1446 |
| 2017/0066375 A1 * | 3/2017 | Kato | H04N 7/181 |
| 2017/0129427 A1 * | 5/2017 | Park | B60K 35/00 |
| 2017/0217335 A1 * | 8/2017 | Tominaga | B60N 2/0228 |
| 2017/0291544 A1 * | 10/2017 | Ishihara | B60Q 9/00 |
| 2017/0315771 A1 * | 11/2017 | Kerr | G06F 3/1446 |
| 2017/0334451 A1 * | 11/2017 | Asakura | B60W 10/04 |
| 2017/0334452 A1 * | 11/2017 | Abe | B60W 10/04 |
| 2018/0059913 A1 * | 3/2018 | Penilla | H04W 4/44 |
| 2018/0111511 A1 * | 4/2018 | Lota | B60N 2/0244 |
| 2018/0194227 A1 * | 7/2018 | Gussen | B60K 35/00 |
| 2018/0222490 A1 * | 8/2018 | Ishihara | B60W 50/14 |

FOREIGN PATENT DOCUMENTS

| | | |
|---|---|---|
| EP | 3025921 A1 | 6/2016 |
| EP | 3031724 A1 | 6/2016 |
| JP | 01-245287 A | 9/1989 |

\* cited by examiner

AUTONOMOUS VEHICLE SEAT POSITIONING SYSTEM

BACKGROUND

Field of the Invention

The present invention generally relates to an autonomous vehicle seat positioning system. More specifically, the present invention relates to an autonomous vehicle seat positioning system configured to store position settings of a vehicle seat assembly corresponding to a driving orientation and a relaxation orientation, and move the vehicle seat assembly between the driving orientation and the relaxation orientation.

Background Information

Autonomous vehicles are configured to operate a vehicle in a self-driving mode and a manual driving mode. The occupant of a driver's seat of an autonomous vehicle can relax while the autonomous vehicle is operating in the self-driving mode.

SUMMARY

One object of the present disclosure is to provide an autonomous vehicle with a seat positioning system that saves seat positions corresponding to a driving orientation of a seat assembly and a relaxing orientation of the seat assembly, and thereafter moving the seat assembly to positions corresponding to the relaxing orientation and the driving orientation depending upon the mode for operation of the autonomous vehicle.

In view of the state of the known technology, one aspect of the present disclosure is to provide an autonomous vehicle seat positioning system, with an autonomous vehicle controller, a display, a vehicle seat assembly, a control panel and a controller. The autonomous vehicle controller is configured to operate a vehicle in a self-driving mode and a manual driving mode. The display is installed to a roof of a passenger compartment within the vehicle. The vehicle seat assembly has a base portion, a seat cushion portion movably supported to the base portion, a seatback portion movably supported to the seat cushion portion, and a positioning mechanism. The positioning mechanism is configured to position the seat cushion portion relative to the base portion and is configured to position the seatback portion relative to the seat cushion portion. The control panel is configured to receive seat positioning inputs made by a first occupant seated in the vehicle seat assembly. The controller is connected to the display, the control panel and the positioning mechanism of the vehicle seat assembly. The controller is configured to operate in a position saving mode and a position selecting mode. Specifically, in the position saving mode, positioning inputs made by the first occupant of the vehicle seat assembly are saved in memory as a first upright setting by the controller. The first upright setting corresponds to the first occupant being positioned for manual driving of the vehicle with the autonomous vehicle controller operating the vehicle in the manual driving mode. Also in the position saving mode, positioning inputs made by the first occupant of the vehicle seat assembly are saved in memory as a first relaxation setting by the controller. The first relaxation setting corresponding to the first occupant is positioned for viewing the display with the vehicle operating in the self-driving mode. In the position selecting mode, in response to the first occupant selecting the first upright setting via the control panel, the controller operates the positioning mechanism to move the seat cushion portion and the seatback portion to positions corresponding the first upright setting. Further, in the position selecting mode, in response to the first occupant selecting the first relaxation setting via the control panel, the controller operates the positioning mechanism to move the seat cushion portion and the seatback portion to the positions corresponding to the first relaxation setting.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
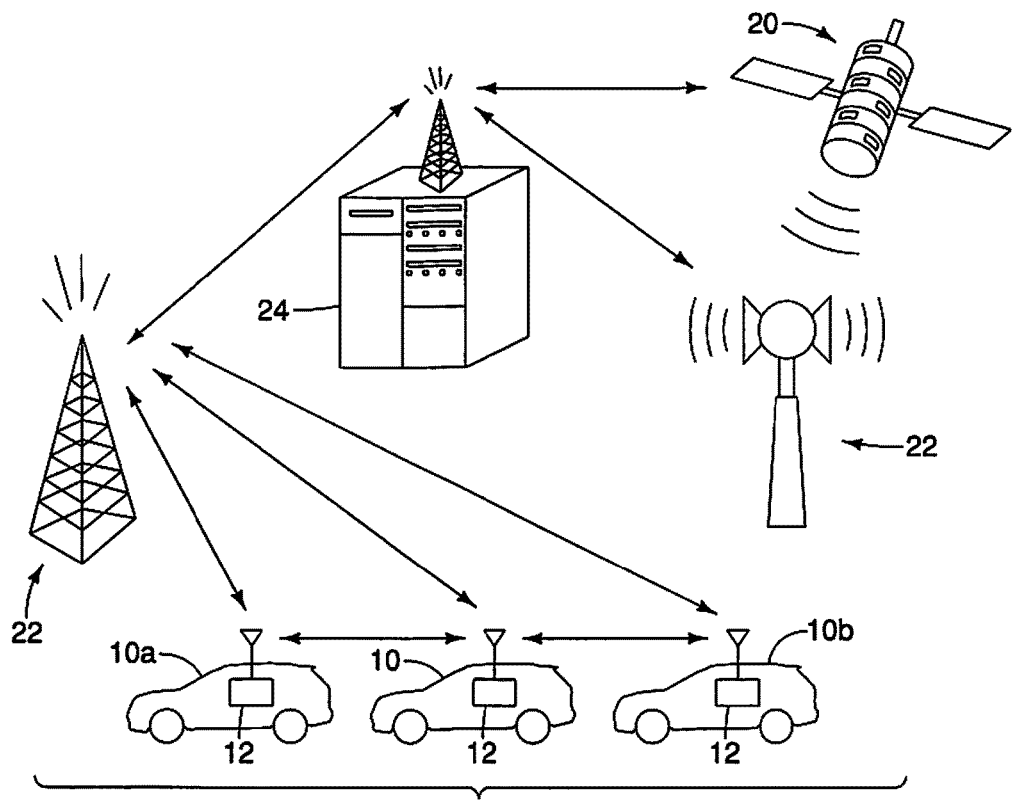
FIG. 1 is a schematic view of an autonomous vehicle system that includes at least a vehicle having a seat positioning system in accordance with one embodiment.
Figure 2:
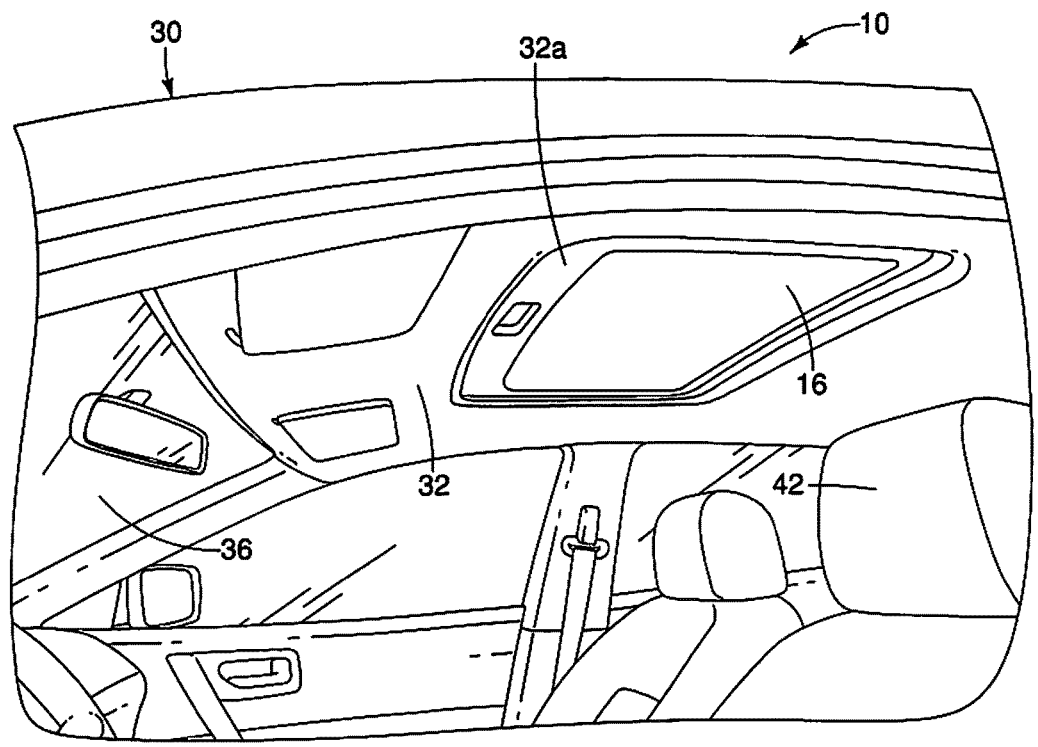
FIG. 2 is a perspective view of a portion of the vehicle showing a display installed to a roof structure of the vehicle in accordance with the one embodiment.
Figure 3:
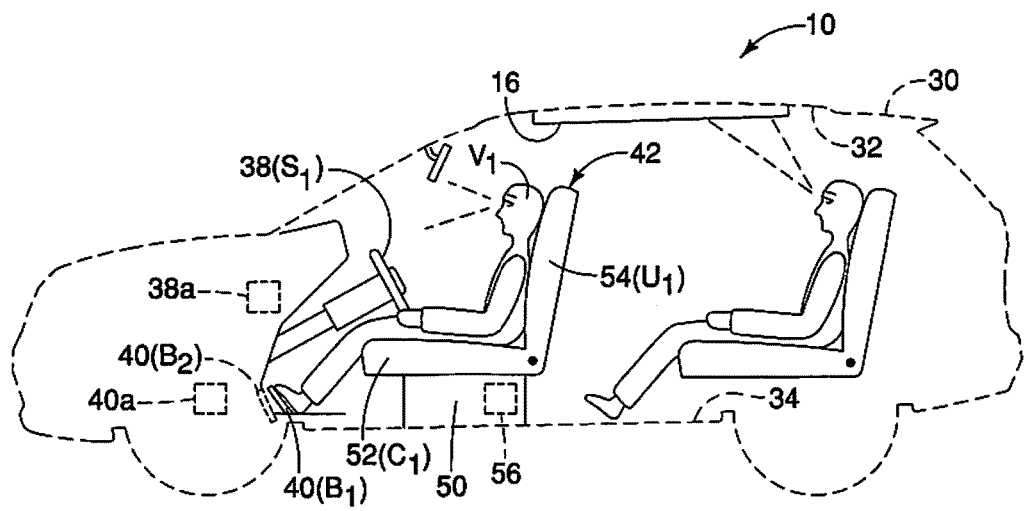
FIG. 3 is a schematic side view of the vehicle showing a seat assembly, a steering column and a brake and accelerator pedal assembly whose positions and orientations can be automatically re-positioned by the seat positioning system, with the seat assembly, the steering column and the brake and accelerator pedal assembly shown in first upright positions with a first vehicle operator seated in the seat assembly with an autonomous vehicle controller set for manual driving of the vehicle in accordance with the one embodiment.
Figure 4:
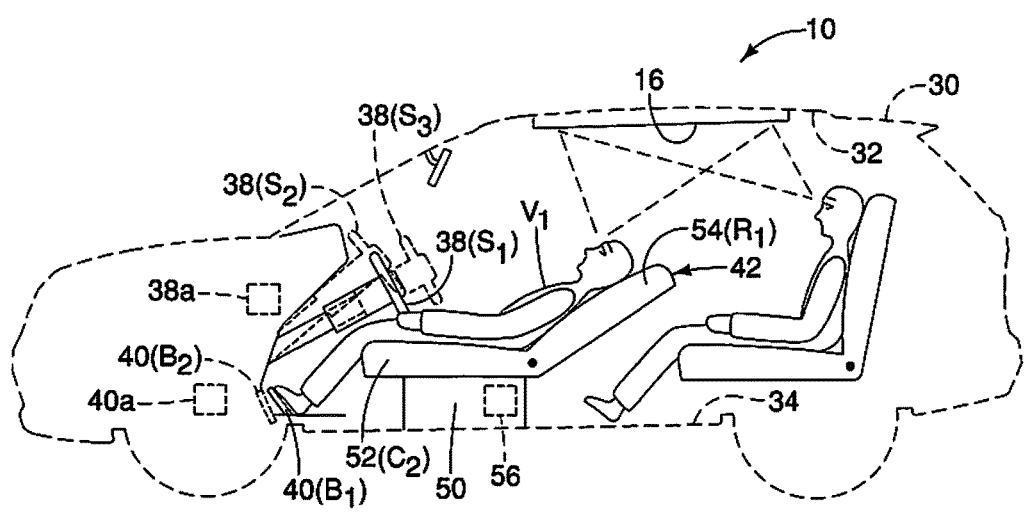
FIG. 4 is another schematic side view of the vehicle similar to FIG. 3 showing the seat assembly, the steering column and the brake and accelerator pedal assembly in first reclined and retracted orientations with the first vehicle operator seated in the seat assembly with the autonomous vehicle controller set for self-driving in accordance with the one embodiment.

FIG. 1 is a block diagram illustrating a plurality of vehicles 10, 10a and 10b that are each equipped with an autonomous vehicle controller 12 that can operate as part of a vehicle control system (autonomous vehicle network or system) depicted schematically in FIG. 1. As shown in FIG. 2, the vehicle 10 also includes a display 16 that is installed within the vehicle 10, as described in greater detail below. As shown in FIGS. 3 and 4, the vehicle 10 also includes an autonomous vehicle seat positioning system 18 (also referred to as the seat positioning system 18) that is configured to operate in concert with operations of the autonomous vehicle controller 12, as described in greater detail below.

The autonomous vehicle controller 12 communicates with at least one of the vehicles 10a and 10b that can also include the autonomous vehicle controller 12. Alternatively, the other vehicles 10a and 10b can include another type of two-way communication system, such as an adaptive cruise control system, that is capable of communicating information about at least the location and speed of the other vehicles 10a and 10b in a conventional manner.

The autonomous vehicle controller 12 of the vehicle 10 and the vehicles 10a and 10b communicates with a two-way wireless communications network. As seen in FIG. 1, for example, the two-way wireless communications network can include one or more global positioning satellites 20 (only one shown), and one or more terrestrial units, such as roadside (terrestrial) units 22 (two are shown), and a base station or external server 24. The global positioning satellites 20 and the roadside units 22 send and receive signals to and from the autonomous vehicle controller 12 of the vehicle 10 and the vehicles 10a and 10b. The base station 24 sends and receives signals to and from the vehicle control system 12 of the host vehicle 10 and the vehicles 10a and 10b via a network of the roadside units 22, or any other suitable two-way wireless communications network.

As shown in more detail in FIG. 8, the autonomous vehicle controller 12 is connected to elements of the seat positioning system 18, as described further below. The autonomous vehicle controller 12 is configured to operate the vehicle 10 in a self-driving mode and a manual driving mode. In the self-driving mode, the autonomous vehicle controller 12 controls all driving related operations such as speed, steering and braking operations of the vehicle 10. In the manual driving mode, the autonomous vehicle controller 12 stops operating the vehicle 10, and a human driver (not shown) operates the vehicle 10 manually, controlling speed, steering and braking operations manually. Since operations of an autonomous vehicle by the autonomous vehicle controller 12, and configurations of the autonomous vehicle controller 12 are conventional and therefore well known, as disclosed by numerous U.S. patents and U.S. published patent applications, further description of operations and configurations of the autonomous vehicle controller 12 are omitted for the sake of brevity.

A brief description of the vehicle 10 is now provided with specific reference to FIGS. 2-7. The vehicle 10 has a vehicle body structure 30 with a roof structure 32 and a floor structure 34 with a passenger compartment 36 defined therebetween. The vehicle 10 also includes a steering column 38, a brake and accelerator pedal assembly 40 and a vehicle seat assembly 42.

The display 16 can be installed directly to an interior surface of the roof structure 32. Alternatively, the display 16 can be part of a sun shade 32a of a sun roof assembly, as shown in FIG. 2. As shown in FIG. 8, the sun roof assembly can include a sun shade/display motor 16a that moves the sun shade 32a and the display 16 between an open position (not shown) exposing the sun roof and a closed position (FIG. 2) covering the sun roof. Further description relating to the display 16 are disclosed in U.S. patent application Ser. No. 15/383,565, filed Dec. 19, 2016. U.S. patent application Ser. No. 15/383,565 is incorporated herein in its entirety. U.S. patent application Ser. No. 15/383,565 also discloses operational features of the display 16.

The steering column 38 is installed to an instrument panel and/or a dash wall at a front portion of the passenger compartment 36 in a conventional manner, as shown in FIGS. 3-6. The steering column 38 includes a steering column positioner 38a that allows for electronically controlled positioning of the steering column 38 in a manner described in greater detail below. The steering column 38 is position-able between a retracted orientation shown in phantom or dashed lines in FIGS. 4 and 6, and any of a plurality of in-use orientations as shown in solid lines in FIGS. 3-6.

The brake and accelerator pedal assembly 40 are conventional mechanisms that provide the vehicle driver with control of braking operations and engine accelerating operations in a conventional manner. The brake and accelerator pedal assembly 40 includes a pedal positioner 40a that allows for electronically controlled positioning of the brake and accelerator pedal assembly 40 in a manner described in greater detail below. The brake and accelerator pedal assembly 40 is position-able between a retracted orientation shown in phantom or dashed lines in FIGS. 4 and 6, and any of a plurality of in-use orientations as shown in solid lines in FIGS. 3-6.

The vehicle seat assembly 42 is installed to the floor structure 34 of the vehicle 10. It should be understood that there are several vehicle seat assemblies 42 within the vehicle 10. However, for the sake of simplicity and brevity, only the vehicle seat assembly 12 used as a driver's seat for a vehicle operator is described hereinbelow.

Figure 7:
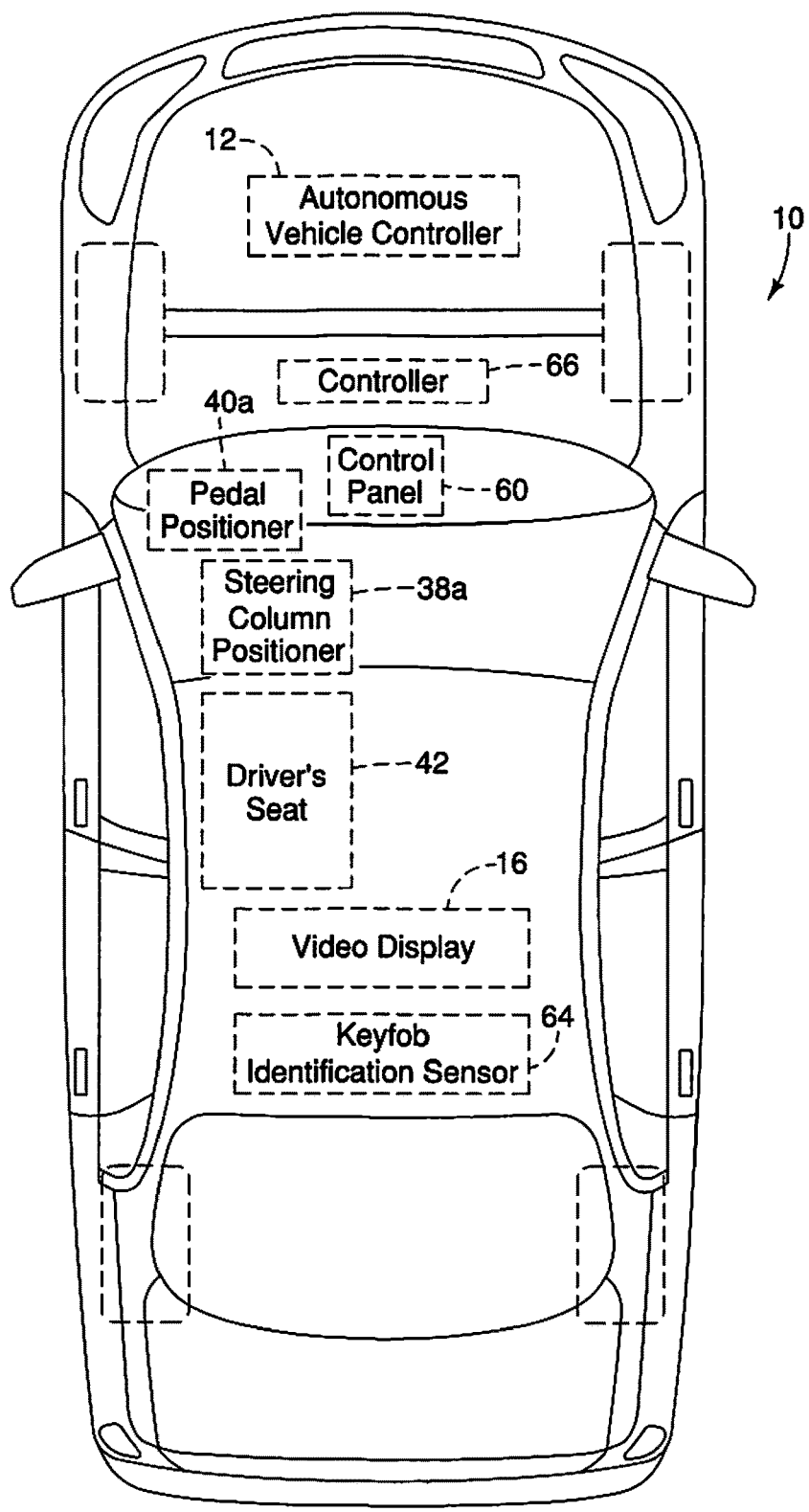
FIG. 7 is a schematic view of the vehicle showing various components of the autonomous vehicle seat positioning system in accordance with the one embodiment.
Figure 8:
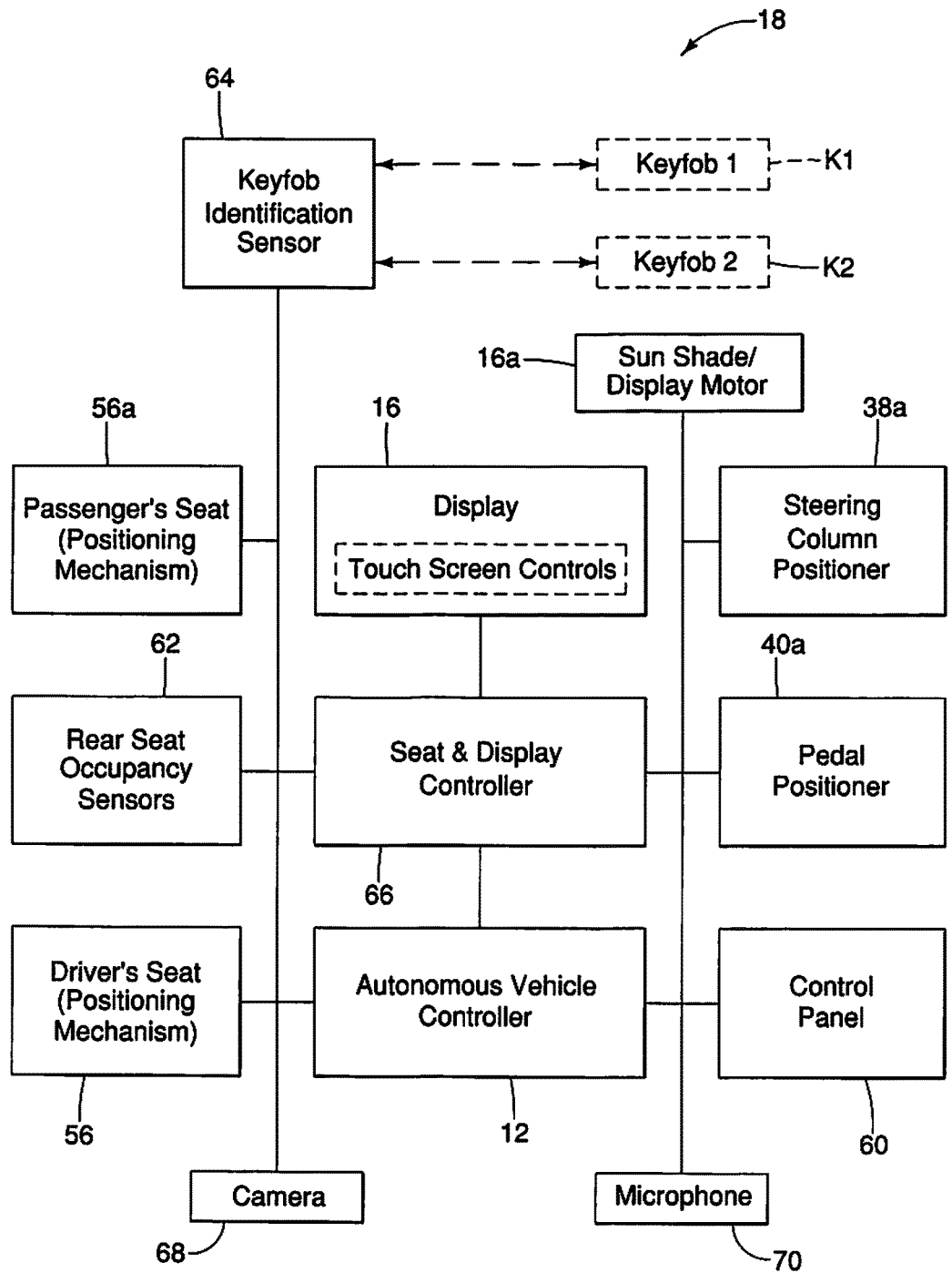
FIG. 8 is a block diagram of the vehicle showing various components of the autonomous vehicle seat positioning system including as a control panel and a seat and display controller in accordance with the one embodiment.

The vehicle seat assembly 42 includes a base portion 50, a seat cushion portion 52, a seatback portion 54, and a positioning mechanism 56 (shown schematically in FIGS. 7 and 8). The base portion 50 is preferably directly attached to the floor structure 34 of the passenger compartment 36 within the vehicle 10. The seat cushion portion 52 is directly supported to the base portion 50 in a conventional manner and is linearly movable relative to and along the base portion 50. Specifically, the seat cushion portion 52 can undergo forward and rearward movement relative to the base portion 50 and the floor structure 34.

The seatback portion 54 is supported for pivotal movement relative to the seat cushion portion 52. More specifically, the seatback portion 54 is supported by a pivoting structure (not shown) that is directly connected to the seatback portion 54 and further connected to the seat cushion portion 52. Hence, the seatback portion 54 pivots about a pivot axis where the pivot axis is fixed in position relative to the seat cushion portion 52.

The positioning mechanism 56 can include two separate electronically controlled devices and/or motors that position and reposition portions of the vehicle seat assembly 42 in a conventional manner. Specifically, the positioning mechanism 56 moves and positions the seat cushion portion 52 relative to the floor structure 34. The positioning mechanism 56 can include a conventional linear track (not shown) and motor (not shown) that effects the movement and repositioning of the seat cushion portion 52. The positioning mechanism 56 is configured to move the seat cushion portion 52 in a vehicle forward and a vehicle rearward directions to any of a plurality of positions relative to the base portion 50. The positioning mechanism 56 also includes a motor (not shown) and gearing mechanism (not shown) that is configured to move the seatback portion 54 to any of a plurality of upright orientations and a plurality of reclined orientations relative to the seat cushion portion 52.

The positioning mechanism 56 is configured to move the seat cushion portion 52 in a vehicle forward and a vehicle rearward directions to any of a plurality of positions relative to the base portion 50. The number of the plurality of positions of the seat cushion portion 52 relative to the base portion 50 depends on the configuration of the positioning mechanism 56. Specifically, the electric motor (not shown) can be any of a variety of positioning motors, such as a stepper motor, that via appropriate gearing can finely and accurately move and position the seat cushion portion 52 returning it to predetermined locations relative to the base portion 50 in a conventional manner.

The positioning mechanism 56 is configured to move the seatback portion 54 to any of the plurality of upright orientations and the plurality of reclined orientations relative to the seat cushion portion 52, as mentioned above. The plurality of upright orientations varies and are generally defined as orientations of the seatback portion 54 that position a vehicle operator seated in the vehicle seat assembly 42 such that the vehicle operator can steer and operate the vehicle 10. The plurality of reclined orientations varies and are generally defined as orientations of the seatback portion 54 that position a vehicle operator seated in the vehicle seat assembly 42 such that the vehicle operator can view the display 16.

Not all vehicle operators are the same size. Therefore, the vehicle operator adjusts the position of the seat cushion portion 52 relative to the base portion 50 and the angle of the seatback portion 54 relative to the seat cushion portion 52 to suit his or her needs and comfort in a manner described further below.

For example, as shown in FIG. 3, the vehicle seat positioning system 18 is configured such that a first vehicle operator $V_1$ seated in the vehicle seat assembly 42 can adjust the seat cushion portion 52 relative to the base portion 50 to a first position $C_1$ of the plurality of positions of the seat cushion portion 52. Further, the first vehicle operator $V_1$ can adjust the seatback portion 54 to a first orientation $U_1$ of the plurality of seat upright orientations. With these adjustments made, the first vehicle operator $V_1$ is positioned for manual driving of the vehicle 10 with the autonomous vehicle controller 12 operating the vehicle in the manual driving mode. As described below, these seat settings are saved in memory.

As shown in FIG. 4, the vehicle seat positioning system 18 is configured such that the first vehicle operator $V_1$ can adjust the seat cushion portion 52 relative to the base portion 50 to a second position $C_2$ of the plurality of positions of the seat cushion portion 52. Further, the first vehicle operator $V_1$ can adjust the seatback portion 54 to a first orientation $R_1$ of the plurality of seat reclined orientations. With these adjustments made, the first vehicle operator $V_1$ is positioned for viewing the display 16 with the autonomous vehicle controller 12 operating the vehicle in the self-driving mode. As described below, these seat settings are saved in memory.

Figure 5:
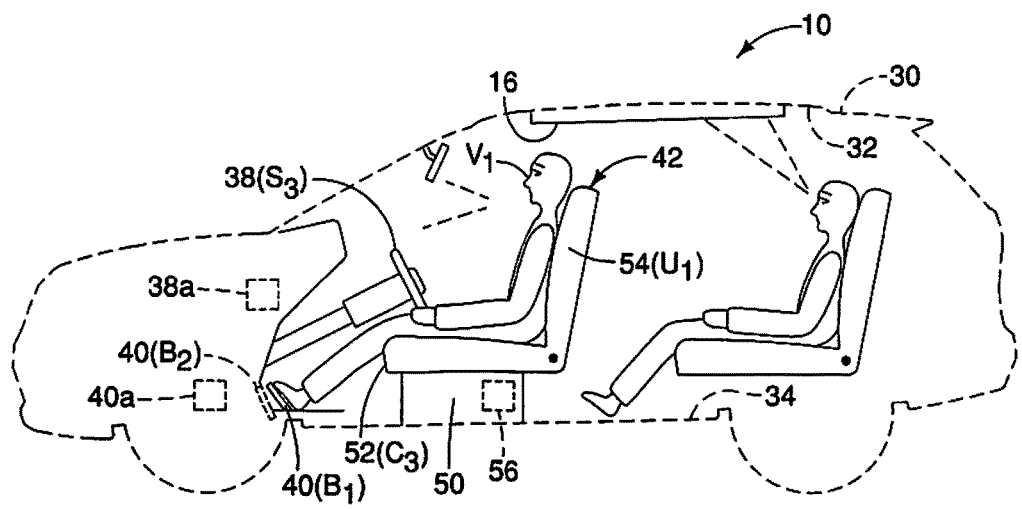
FIG. 5 is another schematic side view of the vehicle similar to FIGS. 3 and 4 showing the seat assembly, the steering column and the brake and accelerator pedal assembly in second upright positions with a second vehicle operator seated in the seat assembly with the autonomous vehicle controller set for manual driving of the vehicle in accordance with the one embodiment.

Similarly, as shown in FIG. 5, the vehicle seat positioning system 18 is configured such that a second vehicle operator $V_2$ seated in the vehicle seat assembly 42 can adjust the seat cushion portion 52 relative to the base portion 50 to a third position $C_3$ of the plurality of positions of the seat cushion portion 52. Further, the second vehicle operator $V_2$ can adjust the seatback portion 54 to a second orientation $U_2$ of the plurality of seat upright orientations. With these adjustments made, the second vehicle operator $V_2$ is positioned for manual driving of the vehicle 10 with the autonomous vehicle controller 12 operating the vehicle in the manual driving mode. As described below, these seat settings are saved in memory.

Figure 6:
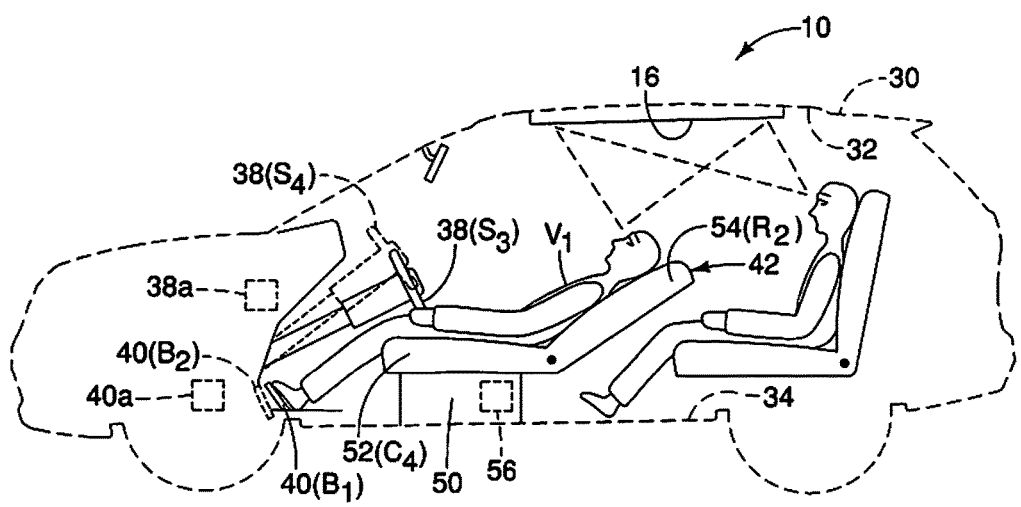
FIG. 6 is another schematic side view of the vehicle similar to FIG. 5 showing the seat assembly, the steering column and the brake and accelerator pedal assembly in second reclined and retracted orientations with the second vehicle operator seated in the seat assembly with the autonomous vehicle controller set for self-driving in accordance with the one embodiment.

As shown in FIG. 6, the vehicle seat positioning system 18 is configured such that the second vehicle operator $V_2$ can adjust the seat cushion portion 52 relative to the base portion 50 to a fourth position $C_4$ of the plurality of positions of the seat cushion portion 52. Further, the second vehicle operator $V_2$ can adjust the seatback portion 54 to a second orientation $R_2$ of the plurality of seat reclined orientations. With these adjustments made, the second vehicle operator $V_2$ is positioned for viewing the display 16 with the autonomous vehicle controller 12 operating the vehicle in the self-driving mode. As described below, these seat settings are saved in memory.

The steering column 38 can be tilted to any of a plurality of orientations and can telescope. Consequently, the first vehicle operator $V_1$ can position steering column 38 to a first driving orientation $S_1$ as shown in FIG. 3. The first vehicle operator $V_1$ can position steering column 38 to a first retracted orientation $S_2$ as shown in FIG. 4.

The second vehicle operator $V_1$ can position steering column 38 to a second driving orientation $S_3$ as shown in FIG. 5. The second vehicle operator $V_2$ can also position steering column 38 to a second retracted orientation $S_4$ as shown in FIG. 6. The second driving orientation $S_3$ is also shown in FIG. 4 to demonstrate the telescoping capabilities of the steering column 38.

The brake and accelerator pedal assembly 40 can also be moved between an in-use orientation $B_1$ or a retracted orientation $B_2$ via a pedal positioner 40a (also referred to as a brake and accelerator pedal positioning mechanism), and intermediate orientations as desired by the first vehicle operator $V_1$ and/or the second vehicle operator $V_2$. The pedal positioner 40a can be an electro-mechanical device connected to a pedal support structure (not shown) supporting the brake and accelerator pedal assembly 40, or can be an electrically operated hydraulic device.

A description of the seat positioning system 18 (also referred to as an autonomous vehicle seat positioning system 18) is now provided with initial reference to FIGS. 7 and 8. The seat positioning system 18 basically includes the display 16, the steering column positioner 38a, the pedal positioner 40a, the positioning mechanism 56 of the seat assembly 42 (the vehicle operator's seat), a positioning mechanism 56a (for a passenger's seat), a control panel 60, rear seat occupancy sensors 62, keyfob identification sensor 64, a first keyfob $K_1$, a second keyfob $K_2$, a seat and display controller 66, an optional camera 68, an optional microphone 70 and the autonomous vehicle controller 12.

As shown in FIG. 8, the display 16, the sun shade/display motor 16a, the steering column positioner 38a, the pedal positioner 40a, the positioning mechanism 56, the positioning mechanism 56a, the control panel 60, the rear seat occupancy sensors 62, the keyfob identification sensor 64, the optional camera 68, the optional microphone 70 and the autonomous vehicle controller 12 are all electronically connected to the seat and display controller 66 (also referred to as a controller).

As indicated in FIG. 8, the keyfob identification sensor 64 communicates with each of the first keyfob $K_1$ and the second keyfob $K_2$ determining the presence of one or the other of the first keyfob $K_1$ and the second keyfob $K_2$.

The display 16 is, for example, a flat panel display configured to display data, camera images, and/or videos such as movies or the like. The steering column positioner 38a is an electronically controlled device that responds to at least two sources of operational commands: commands inputted by the vehicle operator via the control panel 60 changing an angular orientation of the steering column 38 and for changing the telescopic extended position of the steering column 38; and commands sent by the controller 66 to change the angular orientation of the steering column 38 and change the telescopic extended position of the steering column 38 based upon saved or preset position settings.

The pedal positioner 40a is an electronically controlled device that also responds to at least two sources of operational command: commands inputted by the vehicle operator via the control panel 60 changing the position of the brake and accelerator pedal assembly 40 from at least an operating orientation and a retracted orientation; and commands sent by the controller 66 to change the location and orientation of the brake and accelerator pedal assembly 40 based upon saved or preset position settings.

The positioning mechanism 56 of the seat assembly 42 (the vehicle operator's seat) is an electronically controlled device that also responds to at least two sources of operational command: commands inputted by the vehicle operator via the control panel 60 manually adjusting the position of the seat cushion portion 52 and the orientation of the seatback portion 54; and commands sent by the controller 66 to reposition the seat cushion portion 52 and the orientation of the seatback portion 54 based upon saved or preset position settings.

The seat positioning system 18 can also include the optional positioning mechanism 56a (for a passenger's seat), which is operated in a manner similar to that of the positioning mechanism 56 of the seat assembly 42.

The control panel 60 can be installed in any of a plurality of locations within the vehicle 10, but is preferably installed to either the instrument panel within the passenger compartment 36 or a center console (not shown) adjacent to the seat assembly 42. Further, the display 16 can include touch screen controls that provide functions and data input capability similar to that of the control panel 66. The control panel 60 (and the touch screen controls of the display 16) is configured to receive various inputs, such as seat related inputs made by the first occupant $V_1$ (or a second occupant $V_2$) seated in the vehicle seat assembly 42 relating positioning and orientation of the steering column 38, positioning of the brake and accelerator pedal assembly 40, positioning of the seat cushion portion 52 and orientation of the seatback portion 54, among other vehicle related inputs and controls.

The rear seat occupancy sensors 62 are located within a rear seat assembly within the vehicle 10 and provide the controller 66 with information relating to the presence and locations of passengers on the rear seat assembly.

The keyfob identification sensor 64 can be a plurality of sensors located around the vehicle body structure for identifying the presence of one or the other of the first keyfob $K_1$ and the second keyfob $K_2$.

The optional camera 68 can be installed to any of a variety of locations and is configured to provide image information regarding the position and orientation of the vehicle seat assembly 42, and facial recognition images of the first vehicle operator $V_1$ and the second vehicle operator $V_2$ enabling the seat and display controller 66 to determine which vehicle operator is seated in the vehicle seat assembly 42.

The optional microphone 70 can be installed to any of a variety of locations and is configured to provide audio information regarding the first vehicle operator $V_1$ and the second vehicle operator $V_2$ enabling the seat and display controller 66 to determine which vehicle operator is seated in the vehicle seat assembly 42. Further, the optional microphone 70 is configured to receive audio commands from the first vehicle operator $V_1$ and the second vehicle operator $V_2$.

The seat and display controller 66 (hereinafter, the controller 66) is configured to operate in a position saving mode and a position selecting mode. In the position saving mode, the first of the plurality of positions of the seat cushion portion 52 (first position $C_1$) and the first of the plurality of seat upright orientations (first orientation $U_1$) of the seatback portion inputted by the first occupant $V_1$ (also referred to as the first vehicle operator $V_1$) via the control panel 60 are saved in memory as a first upright setting by the controller 66. The first upright setting corresponds to the first occupant $V_1$ being positioned for manual driving of the vehicle 10 with the autonomous vehicle controller 12 operating the vehicle 10 in the manual driving mode.

In the position saving mode, a second (the second position $C_2$) of the plurality of positions of the seat cushion portion 52 and a first of the plurality of seat reclined orientations (the first orientation $R_1$) of the seatback portion 54 inputted by the first occupant $V_1$ via the control panel 60, are saved by the controller 66 as a first relaxation setting. The first relaxation setting corresponds to the first occupant $V_1$ (the first vehicle operator $V_1$) being positioned for viewing the display 16 with the vehicle 10 operating in the self-driving mode by the autonomous vehicle controller 12.

As well, in the position saving mode, the third of the plurality of positions of the seat cushion portion 52 (third position $C_3$) and the second of the plurality of seat upright orientations (second orientation $U_2$) of the seatback portion 54 inputted by the second occupant $V_2$ (also referred to as the second vehicle operator $V_2$) via the control panel 60 are saved in memory as a second upright setting by the controller 66. The second upright setting corresponds to the second occupant $V_2$ being positioned for manual driving of the vehicle 10 with the autonomous vehicle controller 12 operating the vehicle 10 in the manual driving mode.

Further, in the position saving mode, a fourth (the fourth position $C_4$) of the plurality of positions of the seat cushion portion 52 and a second of the plurality of seat reclined orientations (the second orientation $R_2$) of the seatback portion 54 inputted by the second occupant $V_2$ via the control panel 60, are saved by the controller 66 as a second relaxation setting. The second relaxation setting corresponds to the second occupant $V_2$ being positioned for viewing the display 16 with the vehicle 10 operating in the self-driving mode by the autonomous vehicle controller 12.

In the position selecting mode, in response to the first occupant $V_1$ selecting the first upright setting via the control panel 60 or in response to the controller 66 identifying the first occupant $V_1$ as being about to sit in or currently seated in the seat assembly 42, the controller 66 operates the positioning mechanism 56 to move the seat cushion portion 52 to the first of the plurality of positions (first position $C_1$) of the seat cushion portion 52 and the move the seatback portion 54 to the first of the plurality of seat upright orientations (first position $U_1$) of the seatback portion 54.

Further, in the position selecting mode, in response to the first occupant $V_1$ selecting the first relaxation setting via the control panel 60, the controller 66 operates the positioning mechanism 56 to move the seat cushion portion 52 to the second of the plurality of positions (second position $C_2$) of the seat cushion portion 52 and move the seatback portion 54 to the first of the plurality of seat reclining orientations (first position $R_1$).

The controller 66 is further configured such that in the position selecting mode, in response to the second occupant $V_2$ selecting the second upright setting via the control panel 60 or in response to the controller 66 identifying the second occupant $V_2$ as being about to sit in or currently seated in the seat assembly 42, the controller 66 operates the positioning mechanism 56 to move the seat cushion portion 52 to the third of the plurality of positions (third position $C_3$) of the seat cushion portion 52 and the move the seatback portion 54 to the second of the plurality of seat upright orientations (second position $U_2$) of the seatback portion 54.

Further, in the position selecting mode, in response to the second occupant $V_2$ selecting the second relaxation setting via the control panel 60, the controller 66 operates the positioning mechanism 56 to move the seat cushion portion 52 to the fourth of the plurality of positions (fourth position $C_4$) of the seat cushion portion 52 and move the seatback portion 54 to the first of the plurality of seat reclining orientations (second orientation $R_2$).

The controller 66 is configured to identify which vehicle operator (the first vehicle operator $V_1$ or the second vehicle operator $V_2$, or other vehicle operators) is about to enter the vehicle 10 or has already entered the vehicle 10 via several different recognition configurations. For example, the vehicle operator entering the vehicle 10 can identify himself or herself via data entry using the control panel 60. As well, the camera 68 can focus on the face of the vehicle operator and the controller 66, using facial recognition software can recognize the vehicle operator. Further, the microphone 70 can receive voice commands or utilize voice recognition software to recognize the vehicle operator. Finally, the controller 66 can identify the vehicle operator using identification of an approaching keyfob, such as the first keyfob $K_1$, the second keyfob $K_2$ or additional keyfobs. The controller 66 can be configured to link one specific vehicle operator with a corresponding one of the keyfobs.

The controller 66 is also configured to display image and/or video content at any of a plurality of displaying locations of the display 16 where the displaying locations, such as display locations $P_1$, $P_2$, $P_3$, $P_4$, $P_5$ and $P_6$ (shown in FIGS. 13-18) are defined by differing portions of the display 16. The controller 66 is configured such that in the position saving mode, each of the first occupant $V_1$ and the second occupant $V_2$ can designate an optimal display location of the display (one of display locations $P_1$, $P_2$, $P_3$, $P_4$, $P_5$ and $P_6$) and the controller 66 saves the optimal display location designated by the first occupant $V_1$ or the second occupant $V_2$ as part of the corresponding one of the first relaxation setting and the second relaxation setting.

Further, the controller 66 is configured such that in response to the first occupant $V_1$ selecting the first relaxation setting via the control panel 60, the controller 66 operates the display to display image and/or video content at the corresponding optimal displaying location, and in response to the second occupant $V_2$ selecting the second relaxation setting via the control panel 60, the controller 66 operates the display to display image and/or video content at the corresponding optimal displaying location.

The controller 66 is also configured to operate the steering column positioner 38a (also referred to as the steering column positioning mechanism) to move the steering column 38 between a driving orientation (set and saved by the corresponding vehicle operator) with the autonomous vehicle controller 12 operating in the manual driving mode and a retracted orientation with the autonomous vehicle controller 12 operating in the self-driving mode.

The controller 66 is further configured to operate the pedal positioner 40a (also referred to as the brake and accelerator pedal positioning mechanism) to move a brake pedal and an accelerator pedal assembly 40 between a driving orientation with the autonomous vehicle controller 12 operating in the manual driving mode and a retracted orientation with the autonomous vehicle controller 12 operating in the self-driving mode.

A description of one example of control logic that can be utilized by the controller 66 is now provided with specific reference to FIGS. 9-12.

Figure 9:
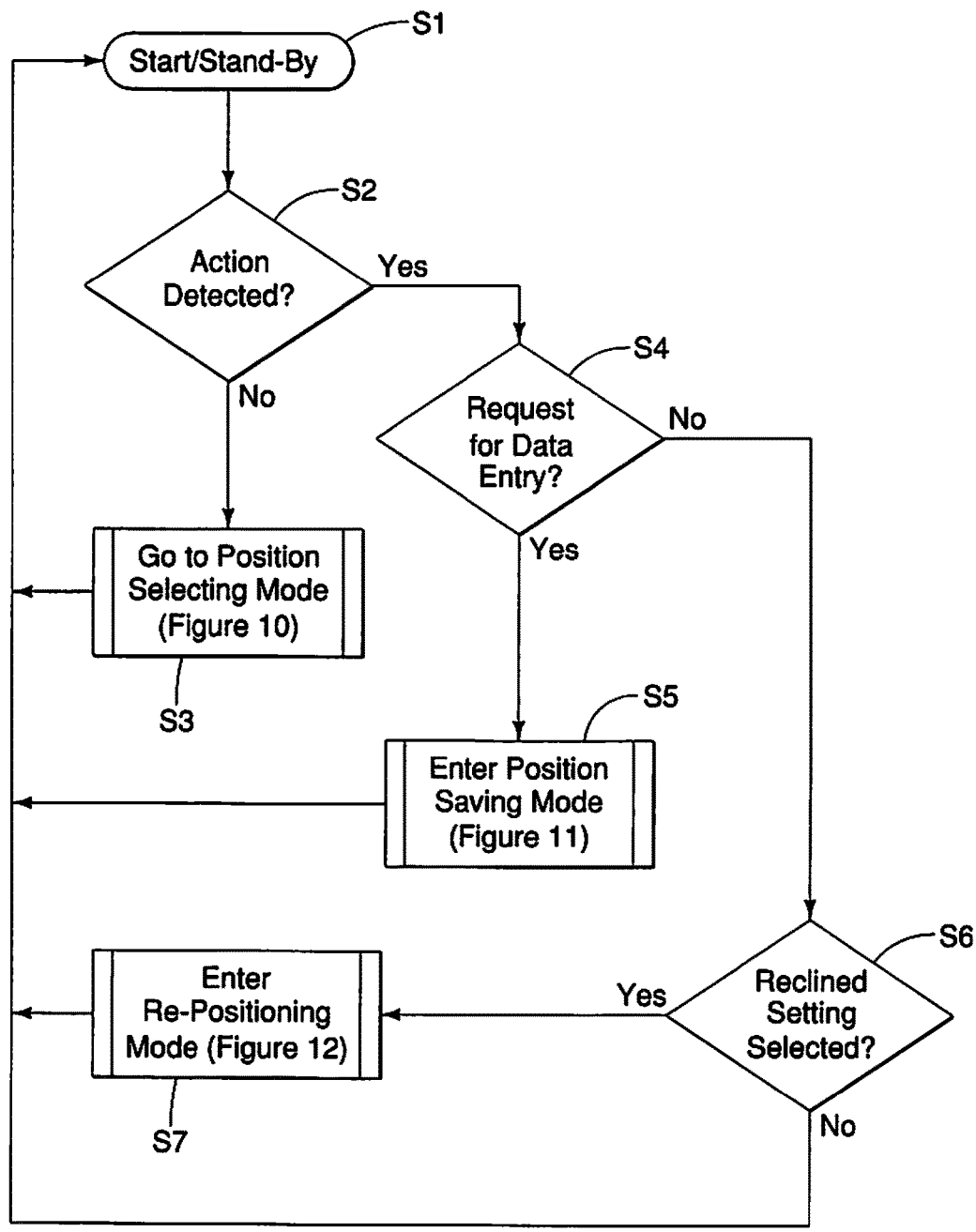
FIG. 9 is a first flowchart showing operational logic conducted by the seat and display controller in accordance with the one embodiment.

As shown in FIG. 9, the controller 66 operates in a start or stand-by mode, as indicated in step S1 while parked and/or waiting for the vehicle 10 to be operated. Once a door has been opened or unlocked via one of the keyfobs, such as the first keyfob $K_1$ and the second keyfob $K_2$, the controller 66 moves to step S2 and waits for actions, such as entry of data by a vehicle occupant using the control panel 60. In step S2, if the controller 66 determines no actions have been taken, operation moves to step S3. If data entry has been recognized, operation moves to step S4.

Figure 10:
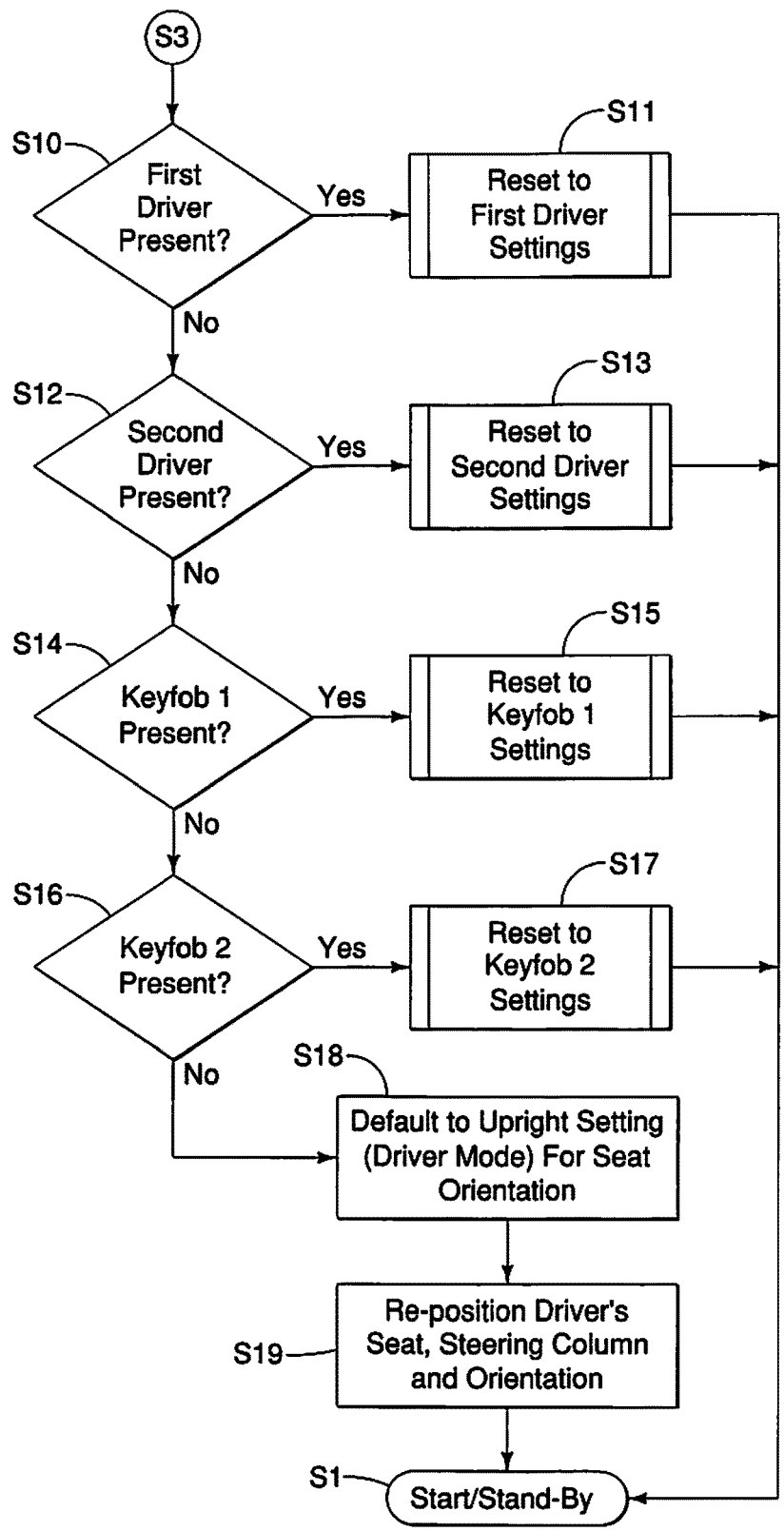
FIG. 10 is a second flowchart showing operational logic conducted by the seat and display controller in accordance with the one embodiment.

At step S3, the controller 66 moves to the operations shown in FIG. 10. At step S4, if the control panel 60 had been operated to enter or edit date, operation moves to Step S5. At step S5 the controller 66 moves to the operations shown in FIG. 11. At step S4, if data is not being entered, but instead a manual selection has been made, operation moves to step S6. At step S6, the controller determines whether or not a reclined setting has been selected. If not, the controller 66 returns to step S1. At step S6, if a reclined setting has been selected, operation moves to step S7, where the controller 66 then moves to the operations shown in FIG. 12.

In FIG. 10, the controller 66 has moved from step S3 in FIG. 9 to step S10. At step S10, the controller 66 determines whether or not a first driver has been identified via either images captured by the camera 68 and/or by voice recognition via voice commands captured by the microphone 70 and processed by the controller 66. If the first driver has been detected, the operation moves to step S11 where first driver settings are implemented, similar to the first upright setting described above, with the vehicle seat assembly 42, the steering column 38 and the brake and accelerator pedal assembly 40 all being repositioned to positions and orientations corresponding to upright settings set by the first driver. After step S11, the controller 66 moves to step S1, returning to FIG. 9.

If the first driver is not present in step S10, operating then moves to step S12. At step S12, the controller 66 determines whether or not a second driver has been identified via either images captured by the camera 68 and/or by voice recognition via voice commands captured by the microphone 70 and processed by the controller 66. If the second driver has been detected, the operation moves to step S13 where second driver settings are implemented, with the vehicle seat assembly 42, the steering column 38 and the brake and accelerator pedal assembly 40 all being repositioned to positions and orientations corresponding to upright settings set by the second driver. After step S13, the controller 66 moves to step S1, returning to FIG. 9.

If the second driver is not present in step S12, operating then moves to step S14. At step S14, the controller 66 determines whether or not the first keyfob $K_1$ has been detected. In the current example of logic conducted by the controller 66, the first keyfob $K_1$ is linked to the first vehicle operator $V_1$ such that the controller 66 determines that the presence of the first keyfob $K_1$ is a confirmation that the first vehicle operator $V_1$ is the current driver of the vehicle 10.

If the first keyfob $K_1$ has been detected, the operation moves to step S15 where first upright setting are implemented, with the vehicle seat assembly 42, the steering column 38 and the brake and accelerator pedal assembly 40 all being repositioned to positions and orientations corresponding to first upright settings set by the first vehicle operator $V_1$. After step S15, the controller 66 moves to step $S_1$, returning to FIG. 9.

If the first keyfob $K_1$ is not present in step S14, operating then moves to step S16. At step S16, the controller 66 determines whether or not the second keyfob $K_2$ has been detected. In the current example of logic conducted by the controller 66, the second keyfob $K_2$ is linked to the second vehicle operator $V_2$ such that the controller 66 determines that the presence of the second keyfob $K_2$ is a confirmation that the second vehicle operator $V_2$ is the current driver of the vehicle 10.

If the second keyfob $K_2$ has been detected, the operation moves to step S17 where second upright setting are implemented, with the vehicle seat assembly 42, the steering column 38 and the brake and accelerator pedal assembly 40 all being repositioned to positions and orientations corresponding to second upright settings set by the first vehicle operator $V_2$. After step S17, the controller 66 moves to step S1, returning to FIG. 9.

If the second keyfob $K_2$ is not present in step S16, operating then moves to step S18 and back to the logic presented in FIG. 9. At step S18, the controller 66 is configured to assume an unknown driver is the current driver of the vehicle 10. Consequently, at step S18, the controller 66 looks in memory for default upright settings for the vehicle seat assembly 42, the steering column 38, and the brake and accelerator pedal assembly 40 so that they can be repositioned to positions and orientations corresponding to a manual driving mode of operation of the vehicle 10.

Next the controller 66 moves to step S19, the controller 66 moves the vehicle seat assembly 42, the steering column 38, and the brake and accelerator pedal assembly 40 to positions and orientations corresponding to the default upright settings corresponding to the manual driving mode of operation of the vehicle 10. Thereafter, the controller 66 moves to step S1, returning to FIG. 9.

Figure 11:
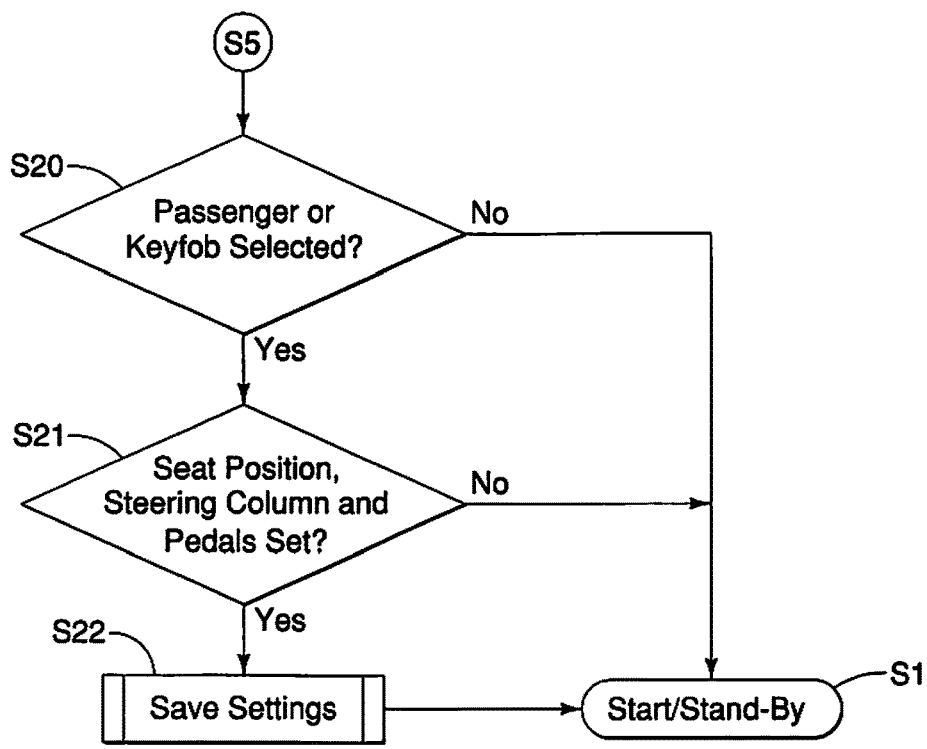
FIG. 11 is a third flowchart showing operational logic conducted by the seat and display controller in accordance with the one embodiment.

In FIG. 11, the controller 66 has moved from step S5 in FIG. 9 to step S20, where the position saving mode is conducted. In the position saving mode, the current driver identifies himself or herself via data entry using the control panel 60. The current driver can also be identified via one of the keyfobs as being associated the current driver. If no current driver has been identified in step S20, the controller 66 moves to step S1, returning to FIG. 9.

If the current driver has been identified, for example, by data entry using the control panel 60, voice or face recognition or the presence of one of the keyfobs, then operation moves to step S21. At step S21, the controller 66 waits for the current driver to adjust position and orientation of each of the seat cushion portion 52, the seatback portion 54, the steering column 38 and the brake and accelerator pedal assembly 40, and indicate via the control panel 60 that the data is to be saved in a file or files corresponding to the current driver (both an upright setting for driving and a reclined setting for watching the display 16). The current driver also selects an optimal location on the display 16 for viewing, for example, a video when the vehicle 10 is operating in the self-driving mode and the seat assembly 42 is in the designated reclined orientation. Specifically, the optimal location on the display 16 is one of the display locations $P_1$, $P_2$, $P_3$, $P_4$, $P_5$ and $P_6$ shown in FIGS. 13-18.

Once the current driver has used the control panel 60 to save the settings, operation moves to step S22, where the controller 66 saves all of the settings.

Figure 12:
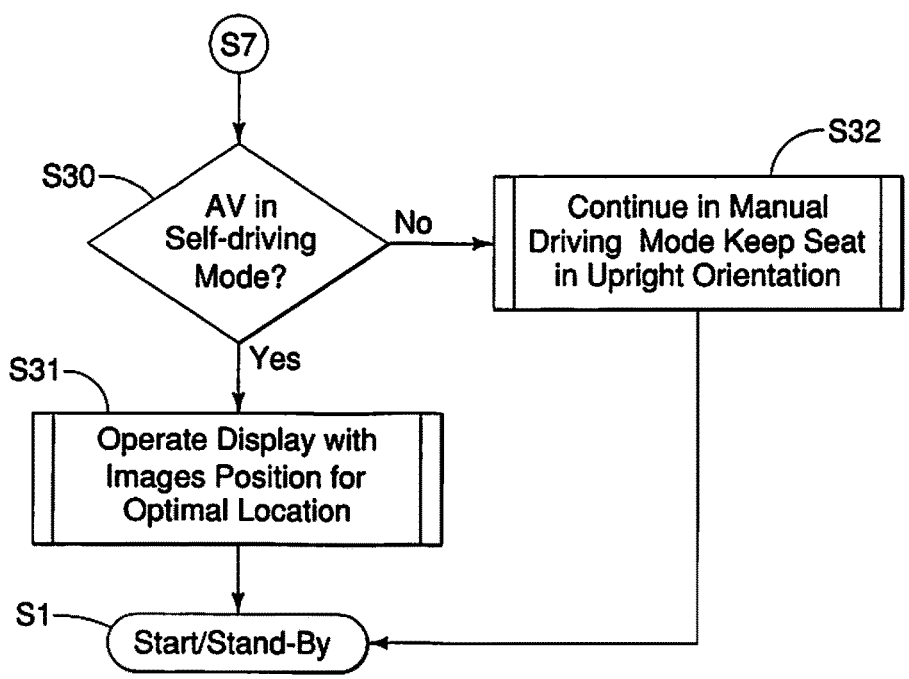
FIG. 12 is a fourth flowchart showing operational logic conducted by the seat and display controller in accordance with the one embodiment.
Figure 13:
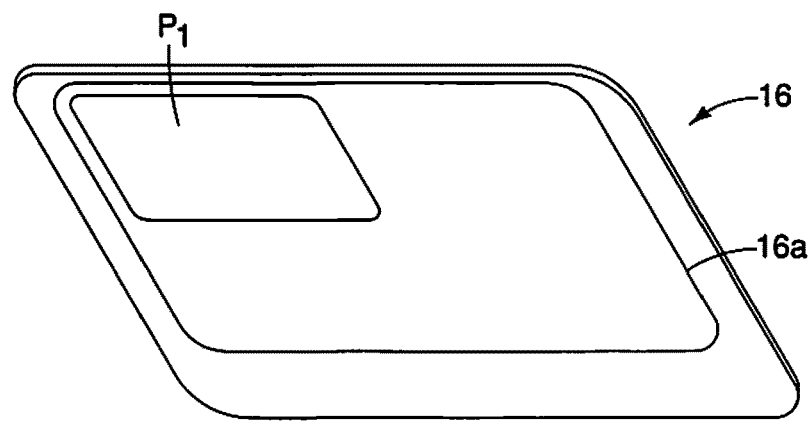
FIG. 13 is a perspective view of the display removed from the vehicle with video content being displayed by the controller on the display in a first position that is oriented for viewing by a passenger in the front seat next to the driver in accordance with the one embodiment.
Figure 14:
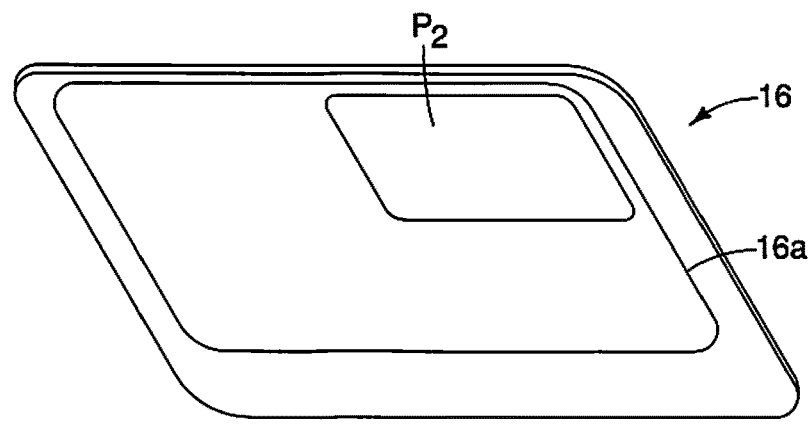
FIG. 14 is another perspective view of the display with video content being displayed by the controller on the display in a second position that is oriented for viewing by the driver in the driver's seat with the driver's seat being reclined in accordance with the one embodiment.
Figure 15:
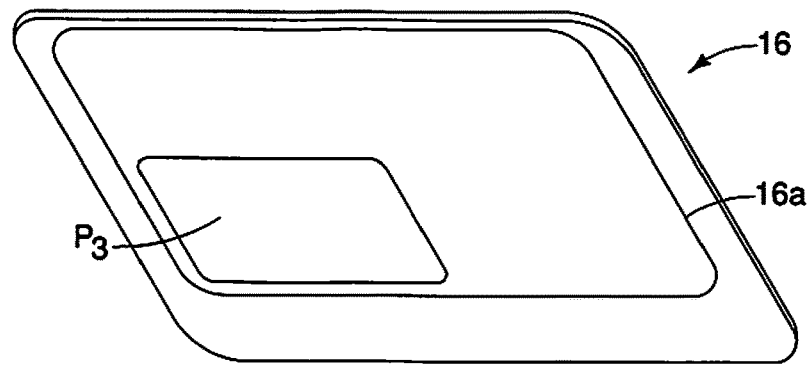
FIG. 15 is another perspective view of the display with video content being displayed by the controller on the display in a third position that is oriented for viewing by a passenger seated at a right-hand side of the rear seat in accordance with the one embodiment.
Figure 16:
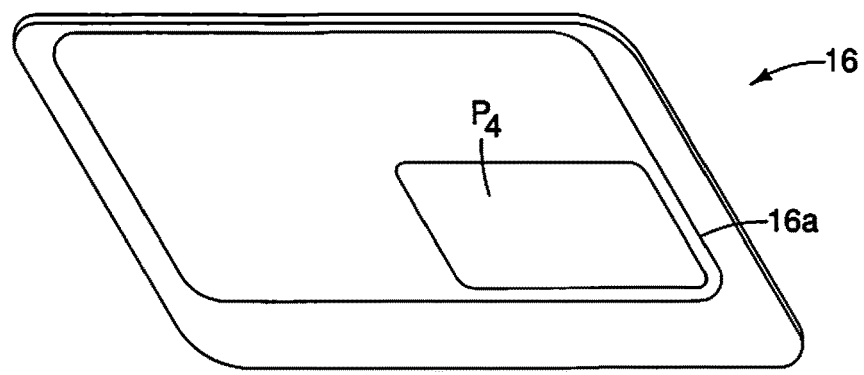
FIG. 16 is another perspective view of the display with video content being displayed by the controller on the display in a fourth position that is oriented for viewing by a passenger seated at a left-hand side of the rear seat in accordance with the one embodiment.
Figure 17:
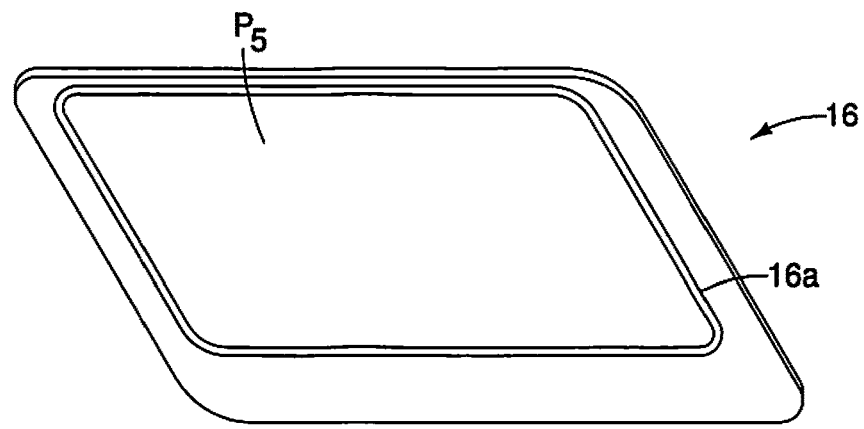
FIG. 17 is another perspective view of the display with video content being displayed by the controller on the display in a fifth position that utilizes all of the viewable area of the electronic display such that all passengers and the driver within the vehicle can view the video content in accordance with the one embodiment.
Figure 18:
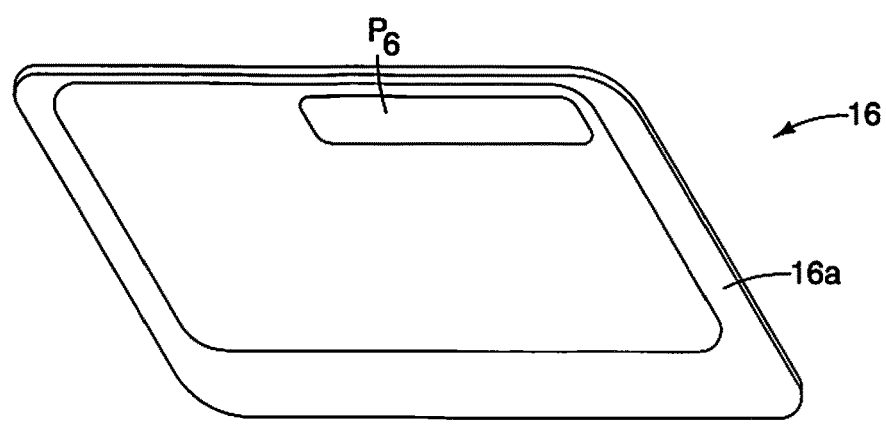
FIG. 18 is another perspective view of the display with vehicle related data being displayed by the controller on the electronic display for viewing by the driver seated in the driver's seat in accordance with the one embodiment.

In FIG. 12, the controller 66 has moved from step S7 in FIG. 9 to step S30. At step S30, the controller 66 communicates with the autonomous vehicle controller 12 and determines whether the vehicle 10 is operating in the self-driving mode. If yes, then operation moves to step S31. If no, then operation moves to step S32.

At step S31, the controller 66 checks the position of the sun shade and the display 16. Specifically, is the sun shade in the open position (not shown) concealing the display 16, or in the closed position (FIG. 2) revealing the display 16? If the sun shade is in the open position, the controller 66 operates the sun shade/display motor 16a and closes the sun shade, revealing the display 16. Further at step S31, the controller 66 operates the display 16 in the optimal location as selected by the current driver. Thereafter, the controller 66 moves to step S1, returning to FIG. 9. U.S. patent application Ser. No. 15/383,565 (incorporated herein by reference) discloses further operational features and functions of the display 16 effected by the controller 66.

It should be understood from the drawings and the description herein, that the autonomous vehicle controller 12 and the controller 66 can be the same electronic controller, or can be several different controllers, each configured to conduct prescribed operations. Further, the optimal display location of the display 16 as determined by the controller 66 in step S31 can be overridden and ignored when multiple passengers are present within the vehicle 10. For example, if there are passengers in the rear seat, then the controller 66 can display images and/or video to the display location $P_5$ shown in FIG. 17, where most if not all of the display area of the display is utilized to show the images and/or video the current driver and passengers. Thus, even though the vehicle operator (driver) has entered a specific display location in his or her reclined settings, the controller 12 can override that particular setting in favor of providing displaying of video or image for all passengers within the vehicle 10.

It should also be understood from the drawings and the description herein that the data input, positioning and setting functions of the control panel 60 can also be duplicated elsewhere in the vehicle 10. For example, the seat positioning and seatback orientation adjustments can be set by a vehicle occupant via a seat control panel (not shown) installed to a portion of the base portion 50 or the seat cushion portion 52. Consequently, a vehicle occupant can override the stored seat positioning and seat orientation settings after being adjusted by the controller 66. Further data input can be accomplished via touch screen controls that can be a part of the display 16. Since touch screen controls are conventional display features, further description is omitted for the sake of brevity.

The controller 66 (and the autonomous vehicle controller 12) preferably includes a microcomputer with a seat and display control program that controls the autonomous vehicle seat positioning system 18. The controller 66 can also include other conventional components such as video player, an image processing and displaying device, an input interface circuit, an output interface circuit, and storage devices such as a ROM (Read Only Memory) device and a RAM (Random Access Memory) device, as well as a video storage device for storing movies, television programs and the like. The microcomputer of the controller 66 is programmed to control the autonomous vehicle seat positioning system 18. The memory circuit stores processing results and control programs such as ones for autonomous vehicle seat positioning system operation that are run by the processor circuit. The controller 66 is operatively coupled to the various components of the autonomous vehicle seat positioning system 18 in a conventional manner. The internal RAM of the controller 66 stores statuses of operational flags and various control data. The internal ROM of the controller 66 stores various operational instructions for operating the various components of the autonomous vehicle seat positioning system. The controller 66 is capable of selectively controlling any of the components of the autonomous vehicle seat positioning system 18 in accordance with the control program. It will be apparent to those skilled in the art from this disclosure that the precise structure and algorithms for the controller 66 can be any combination of hardware and software that will carry out the functions of the present invention.

The various components of the vehicle 10 are conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the autonomous vehicle seat positioning system. Accordingly, these terms, as utilized to describe the present invention should be interpreted relative to a vehicle equipped with the autonomous vehicle seat positioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An autonomous vehicle seat positioning system, comprising:

an autonomous vehicle controller configured to operate a vehicle in a self-driving mode and a manual driving mode;

a display installed to a roof of a passenger compartment within the vehicle, the display defining a plurality of display locations, each of the display locations being defined by differing portions of the display;

a vehicle seat assembly having a base portion, a seat cushion portion movably supported to the base portion, a seatback portion movably supported to the seat cushion portion, and a positioning mechanism, the positioning mechanism being configured to position the seat cushion portion relative to the base portion and being configured to position the seatback portion relative to the seat cushion portion;

a control panel configured to receive seat positioning inputs made by a first occupant seated in the vehicle seat assembly; and a controller connected to the display, the control panel and the positioning mechanism of the vehicle seat assembly, the controller being configured to operate in a position saving mode and a position selecting mode, such that in the position saving mode, positioning inputs made by the first occupant of the vehicle seat assembly are saved in memory as a first upright setting by the controller, the first upright setting corresponding to the first occupant being positioned for manual driving of the vehicle with the autonomous vehicle controller operating the vehicle in the manual driving mode, in the position saving mode, positioning inputs made by the first occupant of the vehicle seat assembly are saved in memory as a first relaxation setting by the controller, the first relaxation setting corresponding to the first occupant being positioned for viewing the display with the vehicle operating in the self-driving mode, in the position saving mode, at least one of the plurality of display locations of the display is selected by the first occupant and saved in memory as an optimal display location for the first occupant with the vehicle operating in the self-driving mode, in the position selecting mode, in response to the first occupant selecting the first upright setting via the control panel, the controller operates the positioning mechanism to move the seat cushion portion and the seatback portion to positions corresponding the first upright setting, and in the position selecting mode, in response to the first occupant selecting the first relaxation setting via the control panel, the controller operates the positioning mechanism to move the seat cushion portion and the seatback portion to the positions corresponding to the first relaxation setting and operates the display to display at least one of an image or video content at the optimal display location for the first occupant.

2. The autonomous vehicle seat positioning system according to claim 1, wherein
the base portion is attached to a floor of the passenger compartment within the vehicle, the seat cushion portion is directly supported to the base portion, the seatback portion is supported for pivotal movement relative to the seat cushion portion.

3. The autonomous vehicle seat positioning system according to claim 2, wherein
the positioning mechanism is configured to move the seat cushion portion in vehicle forward and vehicle rearward directions to any of a plurality of positions relative to the base portion and is further configured to move the seatback portion to any of a plurality of upright orientations and a plurality of reclined orientations relative to the seat cushion portion.

4. The autonomous vehicle seat positioning system according to claim 3, wherein
the controller is configured to save a first of the plurality of positions of the seat cushion portion and a first of the plurality of seat upright orientations of the seatback portion inputted by the first occupant via the control panel as the first upright setting,
the controller is configured to save a second of the plurality of positions of the seat cushion portion and a first of the plurality of seat reclined orientations of the seatback portion inputted by the first occupant via the control panel as the first relaxation setting.

5. The autonomous vehicle seat positioning system according to claim 4, wherein
the controller is further configured to operate the positioning mechanism to move the seat cushion portion to the first of the plurality of positions of the seat cushion portion and the move the seatback portion to the first of the plurality of seat upright orientations of the seatback portion in response to the first occupant selecting the first upright setting, and
the controller is configured to operate the positioning mechanism to move the seat cushion portion to the second of the plurality of positions of the seat cushion portion and move the seatback portion to the first of the plurality of seat reclining orientations in response to the first occupant selecting the first relaxation setting.

6. The autonomous vehicle seat positioning system according to claim 5, wherein
the controller is further configured such that
in the position saving mode, a third of the plurality of positions of the seat cushion portion and a second of the plurality of seat upright orientations of the seatback portion inputted by a second occupant via the control panel are saved in memory as a second upright setting by the controller, the second upright setting corresponding to the second occupant being positioned for manual driving of the vehicle with the autonomous vehicle controller operating the vehicle in the manual driving mode, in the position saving mode, a fourth of the plurality of positions of the seat cushion portion and a second of the plurality of seat reclined orientations of the seatback portion inputted by the second occupant, are saved by the controller as a second relaxation setting, the second relaxation setting corresponding to the second occupant being positioned for viewing the display with the vehicle operating in the self-driving mode, in the position saving mode, at least another of the plurality of display locations of the display is selected by the second occupant and saved in memory as an optimal display location for the second occupant with the vehicle operating in the self-driving mode, in the position selecting mode, in response to the second occupant selecting the second upright setting via the control panel, the controller operates the positioning mechanism to move the seat cushion portion to the third of the plurality of positions of the seat cushion portion and move the seatback portion to the second of the plurality of seat upright orientations of the seatback portion, and in the position selecting mode, in response to the second occupant selecting the second relaxation setting via the control panel, the controller operates the positioning mechanism to move the seat cushion portion to the fourth of the plurality of positions of the seat cushion portion and move the seatback portion to the second of the plurality of seat reclining orientations and operates the display to display at least one of an image or video content at the optimal display location for the second occupant.

7. The autonomous vehicle seat positioning system according to claim 6, further comprising
an occupant identification device connected to the controller such that in response to one of the first occupant and the second occupant entering the vehicle, the occupant identification device and the controller determine which one of the first occupant and the second occupant has entered the vehicle.

8. The autonomous vehicle seat positioning system according to claim 7, further comprising
a first keyfob associated with the first occupant and a second keyfob associated with the second occupant, and
the occupant identification device includes a keyfob identification sensor that detects the presence of the first keyfob and the second keyfob.

9. The autonomous vehicle seat positioning system according to claim 7, further comprising
a microphone connected to the controller, the controller being configured to identify the first occupant or the second occupant via voice recognition analysis.

10. The autonomous vehicle seat positioning system according to claim 1, wherein
the controller is configured to display at least one of an image or video content at any of the plurality of displaying locations of the display where the displaying locations are defined by the differing portions of the display.

11. The autonomous vehicle seat positioning system according to claim 1, further comprising
a steering column positioning mechanism connected to the controller, the controller being configured to operate the steering column positioning mechanism to move a steering column of the vehicle between a driving orientation with the autonomous vehicle controller operating in the manual driving mode and a retracted orientation with the autonomous vehicle controller operating in the self-driving mode.

12. The autonomous vehicle seat positioning system according to claim 1, further comprising
a brake and accelerator pedal positioning mechanism connected to the controller, the controller being configured to operate the brake and accelerator pedal positioning mechanism to move a brake pedal and an accelerator pedal of the vehicle between a driving orientation with the autonomous vehicle controller operating in the manual driving mode and a retracted orientation with the autonomous vehicle controller operating in the self-driving mode.

13. An autonomous vehicle seat positioning system, comprising:
an autonomous vehicle controller configured to operate a vehicle in a self-driving mode and a manual driving mode;
a display installed to a roof of a passenger compartment within the vehicle, the display defining a plurality of display locations, each of the display locations being defined by differing portions of the display;
a vehicle seat assembly having a base portion, a seat cushion portion, a seatback portion, and a positioning mechanism, the base portion being attached to a floor of the passenger compartment within the vehicle, the seat cushion portion being directly supported to the base portion and being movable relative to the base portion, the seatback portion supported for pivotal movement relative to the seat cushion portion, and the positioning mechanism being configured to move the seat cushion portion in vehicle forward and vehicle rearward directions to any of a plurality of positions relative to the base portion and being configured to move the seatback portion to any of a plurality of upright orientations and a plurality of reclined orientations relative to the seat cushion portion;
a control panel configured to receive seat related inputs made by at least a first occupant seated in the vehicle seat assembly; and
a controller connected to the display, the control panel and the positioning mechanism of the vehicle seat assembly, the controller being configured to operate in a position saving mode and a position selecting mode, such that
in the position saving mode, a first of the plurality of positions of the seat cushion portion and a first of the plurality of seat upright orientations of the seatback portion inputted by the first occupant via the control panel are saved in memory as a first upright setting by the controller, the first upright setting corresponding to the first occupant being positioned for operating the vehicle with the vehicle operating in the manual driving mode,
in the position saving mode, a second of the plurality of positions of the seat cushion portion and a first of the plurality of seat reclined orientations of the seatback portion inputted by the first occupant via the control panel, are saved by the controller as a first relaxation setting, the first relaxation setting corresponding the first occupant being positioned for viewing the display with the vehicle operating in the self-driving mode,
in the position saving mode, at least one of the plurality of display locations of the display is selected by the first occupant and saved in memory as an optimal display location for the first occupant with the vehicle operating in the self-driving mode,
in the position selecting mode, in response to the first occupant selecting the first upright setting via the control panel, the controller operates the positioning mechanism to move the seat cushion portion to the first of the plurality of positions of the seat cushion portion and the move the seatback portion to the first of the plurality of seat upright orientations of the seatback portion, and
in the position selecting mode, in response to the first occupant selecting the first relaxation setting via the control panel, the controller operates the positioning mechanism to move the seat cushion portion to the second of the plurality of positions of the seat cushion portion and move the seatback portion to the first of the plurality of seat reclining orientations, and operates the display to display at least one of an image or video content at the optimal display location for the first occupant.

14. The autonomous vehicle seat positioning system according to claim 13, wherein
the controller is further configured such that
in the position saving mode, a third of the plurality of positions of the seat cushion portion and a second of the plurality of seat upright orientations of the seatback portion inputted by a second occupant via the control panel are saved in memory as a second upright setting by the controller, the second upright setting corresponding to the second occupant being positioned for manual driving of the vehicle with the autonomous vehicle controller operating the vehicle in the manual driving mode, in the position saving mode, a fourth of the plurality of positions of the seat cushion portion and a second of the plurality of seat reclined orientations of the seatback portion inputted by the second occupant, are saved by the controller as a second relaxation setting, the second relaxation setting corresponding to the second occupant being positioned for viewing the display with the vehicle operating in the self-driving mode, in the position saving mode, at least one of the plurality of display locations of the display is selected by the second occupant and saved in memory as an optimal display location for the second occupant with the vehicle operating in the self-driving mode, in the position selecting mode, in response to the second occupant selecting the second upright setting via the control panel, the controller operates the positioning mechanism to move the seat cushion portion to the third of the plurality of positions of the seat cushion portion and move the seatback portion to the second of the plurality of seat upright orientations of the seatback portion, and in the position selecting mode, in response to the second occupant selecting the second relaxation setting via the control panel, the controller operates the positioning mechanism to move the seat cushion portion to the fourth of the plurality of positions of the seat cushion portion and move the seatback portion to the second of the plurality of seat reclining orientations and operates the display to display at least one of an image or video content at the optimal display location for the second occupant.

15. The autonomous vehicle seat positioning system according to claim 13, wherein the display is attached to a sun shade movable between an open position concealing the display and a closed position revealing the display, the controller is connected to a sun shade/display motor and is configured to determine whether or not the sun shade is in the closed position, and in response to determining that the sun shade is in the open position and that the further determining that the display is to be operated, the controller operates the sun shade/display motor moving the sun shade to the closed position.

16. An autonomous vehicle seat positioning system, comprising:

an autonomous vehicle controller configured to operate a vehicle in a self-driving mode and a manual driving mode;

a display installed to a roof of a passenger compartment within the vehicle, the display defining a plurality of display locations, each of the display locations being defined by differing portions of the display;

a vehicle driver's seat assembly having a positioning mechanism configured to adjust position and orientation of the vehicle driver's seat assembly;

a control panel configured to receive seat positioning and orientation inputs made by a first occupant seated in the vehicle driver's seat assembly;

at least one passenger seat; and a controller connected to the display, the control panel and the positioning mechanism of the vehicle driver's seat assembly, the controller being configured to operate in a position saving mode and a position selecting mode, such that in the position saving mode, positioning inputs made by the first occupant of the vehicle driver's seat assembly are saved in memory as a first upright setting by the controller, the first upright setting corresponding to the first occupant being positioned for manual driving of the vehicle with the autonomous vehicle controller operating the vehicle in the manual driving mode, in the position saving mode, positioning inputs made by the first occupant of the vehicle driver's seat assembly are saved in memory as a first relaxation setting by the controller, the first relaxation setting corresponding to the first occupant being positioned for viewing the display with the vehicle operating in the self-driving mode, in the position saving mode, at least one of the plurality of display locations of the display is selected by the first occupant and saved in memory as an optimal display location for the first occupant with the vehicle operating in the self-driving mode, in the position selecting mode, in response to the first occupant selecting the first upright setting via the control panel, the controller operates the positioning mechanism to move the seat cushion portion and the seatback portion to positions corresponding the first upright setting, in the position selecting mode, in response to the first occupant selecting the first relaxation setting via the control panel, the controller operates the positioning mechanism to move the seat cushion portion and the seatback portion to the positions corresponding to the first relaxation setting, and operates the display to display at least one of an image or video content at the optimal display location for the first occupant.

* * * * *